(12) United States Patent
Yamazaki et al.

(10) Patent No.: US 7,460,285 B2
(45) Date of Patent: Dec. 2, 2008

(54) LOAD ALLOCATION WHEN EXECUTING IMAGE PROCESSING USING PARALLEL PROCESSING

(75) Inventors: Satoshi Yamazaki, Nagano-ken (JP); Toshiaki Kakutani, Nagano-ken (JP); Teruyuki Takata, Nagano-ken (JP); Kohei Utsunomiya, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 376 days.

(21) Appl. No.: 11/212,430

(22) Filed: Aug. 24, 2005

(65) Prior Publication Data

US 2006/0050955 A1 Mar. 9, 2006

(30) Foreign Application Priority Data

Aug. 25, 2004 (JP) ............... 2004-245085

(51) Int. Cl.
*H04N 1/52* (2006.01)
*H04N 1/405* (2006.01)
*G06K 15/00* (2006.01)
*H04N 1/40* (2006.01)
*H04N 1/46* (2006.01)
*G06F 9/46* (2006.01)

(52) U.S. Cl. ............... 358/534; 358/1.9; 358/3.03; 358/3.05; 358/3.06; 382/304; 718/105

(58) Field of Classification Search ............... 358/1.9, 358/3.03, 3.05, 3.06, 534; 382/304; 715/105
See application file for complete search history.

(56) References Cited

U.S. PATENT DOCUMENTS 5,765,146 A * 6/1998 Wolf et al. ............ 707/2
5,881,283 A * 3/1999 Hondou et al. ............ 718/100
5,930,010 A * 7/1999 Cheung et al. ............ 358/534

(Continued)

FOREIGN PATENT DOCUMENTS

JP 2000-293674 10/2000

OTHER PUBLICATIONS

Performance Modeling of Operating Systems Using Object-Oriented Simulation—A Practical Introduction. Garrido, Jose M. Pring (c)2000 Kluwer Academic/Plenum Publishers. First Edition. pp. 85-109.*

(Continued)

*Primary Examiner*—Twyler L. Haskins
*Assistant Examiner*—Fred Guillermety
(74) *Attorney, Agent, or Firm*—Martine Penilla & Gencarella, LLP

(57) ABSTRACT

For image processes performed repeatedly using a plurality of processing units on a plurality of partial images aligned mutually adjacent to each other, specified processing is performed. This image process includes (i) a first-type process segment on first partial image data representing a partial image to generate M types (M is an integer of 2 or greater) of second partial image data; and (ii) the respectively corresponding M types of second-type process segments on the M types of second partial image data. When executing image processing, parallel processing is performed for the second-type process segment relating to the i-th (i is a positive integer) partial image and the first-type process segment relating to any of the (i+1)-th to the (i+p)-th (p is a positive integer) partial images.

19 Claims, 9 Drawing Sheets

U.S. PATENT DOCUMENTS

| | | | |
|---|---|---|---|
| 6,532,016 B1 * | 3/2003 | Venkateswar et al. | 345/504 |
| 2003/0137698 A1 * | 7/2003 | Pritchard | 358/3.06 |
| 2004/0008382 A1 * | 1/2004 | Barbalet | 358/3.03 |
| 2004/0207879 A1 * | 10/2004 | Bailey et al. | 358/3.03 |
| 2005/0141017 A1 * | 6/2005 | Matsumura | 358/1.15 |
| 2005/0260021 A1 * | 11/2005 | Abello | 400/62 |

OTHER PUBLICATIONS

Abstract of Japanese Patent Publication No. 2000-293674, Pub. Date: Oct. 20, 2000, Patent Abstracts of Japan.

* cited by examiner

LOAD ALLOCATION WHEN EXECUTING IMAGE PROCESSING USING PARALLEL PROCESSING

BACKGROUND OF THE INVENTION

1. Field of the Invention

The present invention relates to technology for executing parallel image processing.

2. Description of the Related Art

There has been developed a parallel processing technology for use in converting image data expressing tone values of each color of ink of each pixel to image data expressing the absence or presence of ink color dots for each pixel. For example, in JP2000-293674A, disclosed is technology for executing rasterizing (data rearranging) processing and halftone processing according to the processing contents using separate threads.

However, for the technology noted above, there was no consideration for efficient execution on the parallel processing.

An object of the present invention is to provide a technology for efficiently executing parallel image processing.

The present invention is related to Japanese patent applications No. 2004-245085, filed Aug. 25, 2004 and No. 2004-245078, filed Aug. 25, 2004; the contents of which are incorporated herein by reference.

SUMMARY OF THE INVENTION

To address at least one of the aforementioned subjects, the present invention performs specified processes for image processing. First-type processing is executed on a first partial image data representing a partial image to generate a second partial image data. Then second-type processing is executed on the second partial image data. The execution of the first and second-type processing are repeated on a plurality of partial images aligned to be adjacent to each other using a plurality of processing units respectively capable of executing the first and second-type process segments. In the image processing, a first-type process segment and a second-type process segment are executed parallel using the plurality of processing units. The first-type process segment relates to i-th partial image. The second-type process segment relates to any of (i+1)-th to (i+p)-th partial images (i is a positive integer, and p is a positive integer).

In this aspect, it is possible to decrease the idle time of the processing unit waiting for the completion of the first-type process segment, while maintaining the constraint in which the first-type process segment is completed before the start of the second-type process segment for the same partial image. Thus, image processing can be performed efficiently when executing image processing using parallel processing.

The first partial image data may be represented by a first color system. In the first-type process segment, the first partial image data may be converted into image data represented by a second color system having M (M is an integer of 2 or greater) color components to generate M types of the second partial image data corresponding to the color components. The second-type process segment may be halftone processing.

For image processing, it is possible to perform the static scheduling as described below to execute processing. (a) Process segments of a subject process segment set are allocated to the plurality of processing units in sequence. The subject process segment set includes: at least one second-type process segment which relates to i-th (i is a positive integer) partial image but has not yet been allocated to one of the processing units; and a plurality of first-type process segments which relate to (i+1)-th to (i+p)-th (p is a positive integer) partial images but have not yet been allocated to the processing units. (b) Then the first and second-type process segments are executed in the allocated sequence on allocated processing units respectively.

With this aspect, process segments can be allocated to the processing units so that the second-type process segments relating to the i-th (i is a positive integer) partial images and the first-type process segments relating to any of the (i+1)-th to (i+p)-th (p is a positive integer) partial images are likely to be executed parallel.

Note that it is also possible to perform the following procedure in image processing. Before the allocation of the process segments, a load of the first-type process segment of the subject process segment set is estimated based on execution results of a preceding first-type process segment. A load of the second-type process segment of the subject process segment set is estimated based on execution results of a preceding second-type process segment of same type. In the allocation of the process segments, one process segment included in the subject process segment set is selected according to a priority sequence of decreasing estimated loads. Then the selected process segment is allocated to a processing unit with a lowest total estimated load of process segments already allocated. The selection and allocation are repeated. With this aspect, it is possible to equalize the load between each processing unit using accurately estimated loads based on the immediately prior execution results.

For image processing, it is also possible to perform dynamic scheduling as described below to execute processing. One process segment is selected from among the subject process segment set. The selected process segment is allocated to one of the plurality of processing units. Then the selected process segment is executed on the allocated processing units. The selection, the allocation and the execution are repeated.

Even with this aspect, the second-type process segments relating to i-th (i is a positive integer) partial images and the first-type process segments relating to any of the (i+1)-th to the (i+p)-th (p is a positive integer) partial images are likely to be performed parallel.

It is preferable to estimate the loads of each process segment of the subject process segment set based on the immediately prior execution results as described above before the allocation and execution to processing units. Then, it is preferable that for the allocation and execution of process segments, the process with the largest estimated load within the subject process segment set be selected and that this be allocated to and executed on the processing unit for which the process segments to be executed first run out. By using this aspect, using an accurately estimated load based on the immediately prior execution results as well as the actual processing results on the processing units, it is possible to attempt a higher degree of equalization of loads between the processing units.

It is also preferable to use the aspect described below when at least one process segment among the M types of second-type process segments is a restricted process that can be executed only after completion of the same type of process segment relating to the immediately prior partial image. The subject process segment set further includes a restricted process that (i) relates to one of the (i+1)-th to (i+q)-th (q is a positive integer) partial images; (ii) has not yet been allocated to one of the processing units; and (iii) when it is assumed that the restricted process has been allocated to one of the processing units, a same type of restricted process relating to immediately prior partial image is completed at a scheduled time for starting execution of the restricted process. In this aspect, using a higher number of types of process segments, it is possible to allocate process segments so as to be efficiently executed without the processing units idling.

The subject process segment set may further includes a process that is a non-restricted process that is not the restricted process among the second-type process segments; relates to one of the (i+1)-th to (i+q)-th (q is a positive integer) partial images; and has not yet been allocated to one of the processing units. With this aspect, using even a higher number of types of processes, it is possible to allocate processes to processing units with less wait time so that the processing units execute processes efficiently.

The restricted process may be a halftone process performed using an error diffusion method. The non-restricted process may be a halftone process performed using a dither method.

It is preferable that the first and second-type process segments are executed by hyper threading using the image processing device. In such an aspect, each of the processing units may be a thread.

Note that the present invention can be realized in various embodiments. For example, it can be realized in embodiments such as a process allocation method, a process allocation device, an image processing method, an image processing device, a printing control method, a printing control device, a printing method, a printing device, and also as a computer program for realizing the functions of those methods or devices or a recording medium on which that computer program is recorded, or the like.

These and other objects, features, aspects, and advantages of the present invention will become more apparent from the following detailed description of the preferred embodiments with the accompanying drawings.

DETAILED DESCRIPTION OF THE INVENTION

Embodiments of the invention are described in the following sequence.
A. SUMMARY OF PREFERRED EMBODIMENTS:
B. First Embodiment:
 B1. Overall Structure of the Device
 B2. Internal Structure of the CPU
 B3. Color Conversion Processing and Halftone Processing
C. Second Embodiment:
D. Third Embodiment:
E. Modifications:

A. SUMMARY OF PREFERRED EMBODIMENTS

At a printer driver, color conversion processing and the halftone processing thereafter are performed using two threads. The color conversion process and the halftone process are performed in sequence from top of the image in units of partial image area LLs (i) which is two lines of the image data raster lines. The color conversion processing will be hereinafter referred to as "color conversion process segment" or "process segment." The halftone processing for one ink color will be hereinafter referred to as "unit HT process segment" or "process segment." When allocating process segments to each thread, a process segment is selected in sequence from among the halftone process segments C (i), M (i), Y (i), and K (i) of the color of cyan, magenta, yellow, black for the unprocessed i-th partial image area LLs (i) and the color conversion process segment Cc (i) of the next (i+1)-th partial image area LLs (i+1). Then the selected process segment is allocated to one of the threads (see FIG. 7). At that time, the process segments are allocated so that the load of both threads is approximately equal. The estimated load of each process is calculated based on the processing results of the immediately prior (i−1)-th partial image area LLs (i−1).

Figure 7:
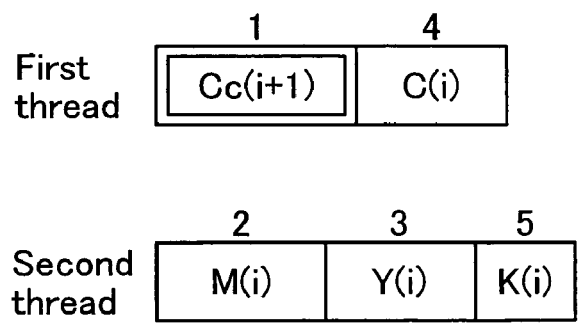
FIG. 7 shows the color conversion process segment and the unit HT process segment allocated to the first and second threads.
Figure 8:
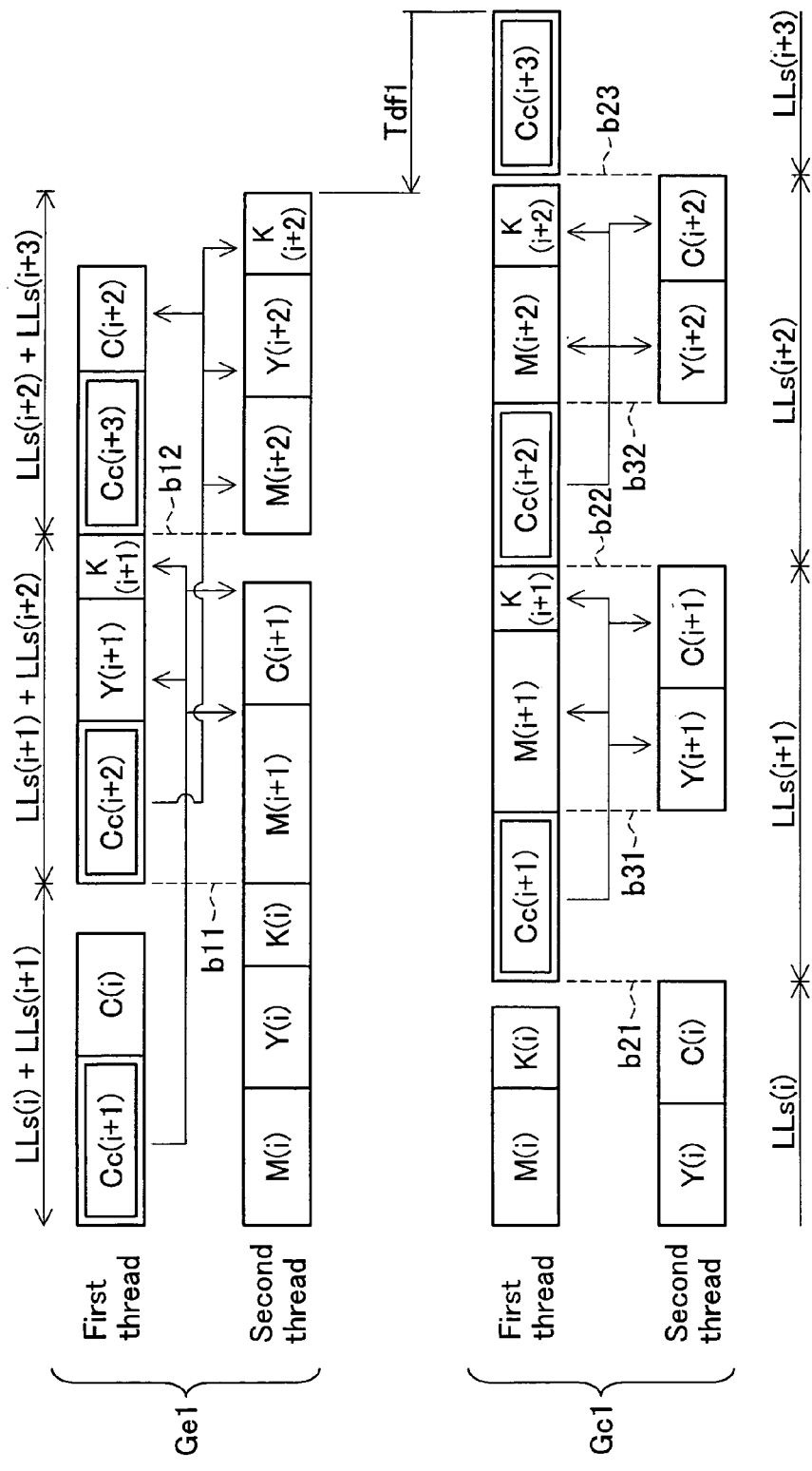
FIG. 8 is a Gantt chart showing the method of execution for processes allocated to the first and the second threads.

The color conversion process segment Cc (i+1) of the (i+1)-th partial image allocated to the thread undergoes parallel processing together with the halftone processing of any of the colors for the i-th partial images which is allocated to the other thread (see FIG. 7 and FIG. 8 upper left M (i)). For this aspect, the color conversion process segment Cc (i+1) for the (i+1)-th partial image can be executed before the completion of all the halftone process segment C (i), M (i), Y (i), and K (i) for the preceding i-th partial image. Accordingly, both threads are used effectively, and color conversion processing and halftone processing can be performed efficiently.

B1. Overall Constitution of the Device

Figure 1:
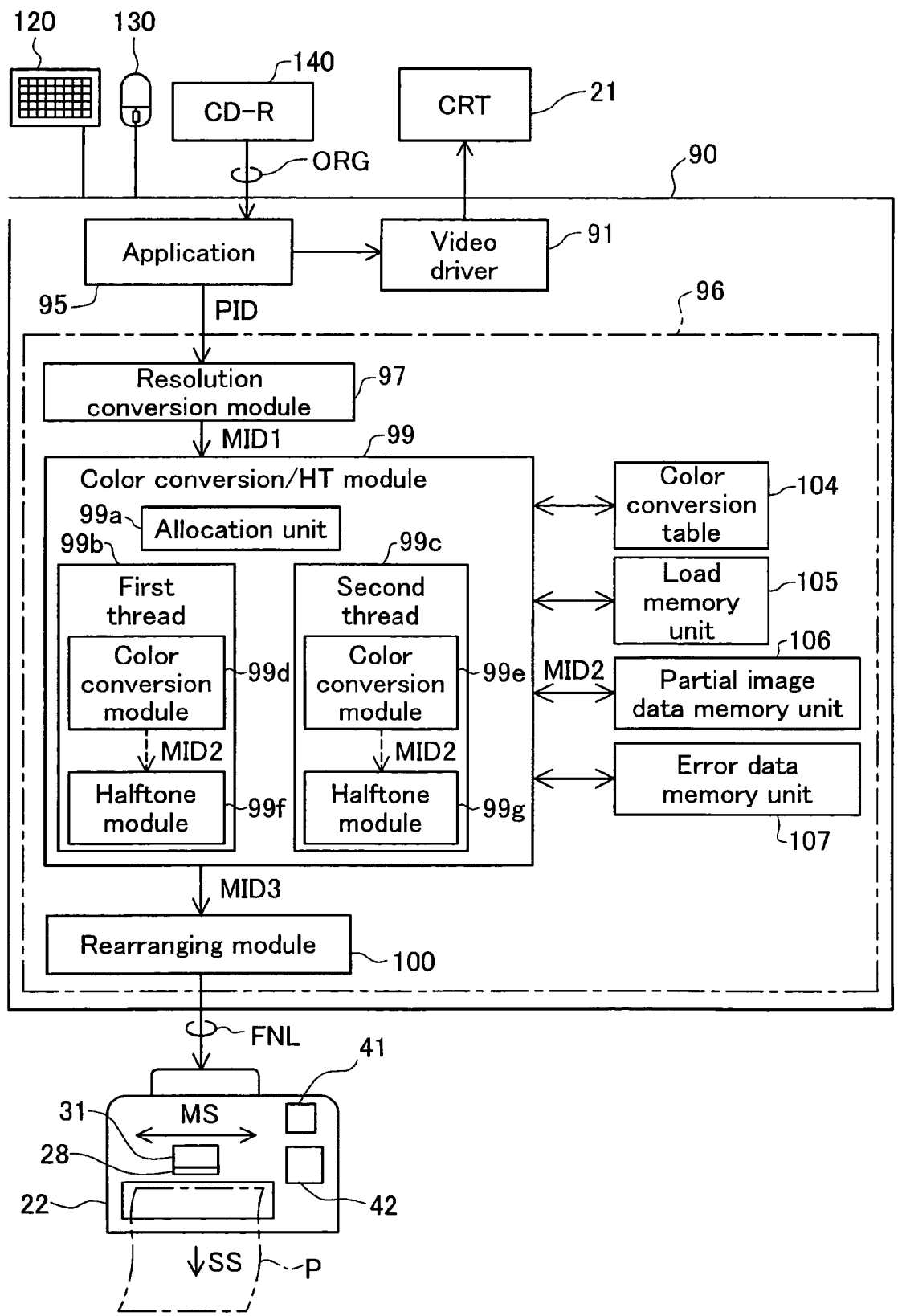
FIG. 1 is a block diagram showing the software configuration of the printing system of the first embodiment.

FIG. 1 is a block diagram showing the software configuration of the printing system of the first embodiment. With a computer 90, an application program 95 operates under a specified operating system. Also, a video driver 91 and the printer driver 96 are incorporated in the operating system.

The application program 95 reads original image data ORG consisting of the three color components red (R), green (G), and blue (B) from a CD-R 140, according to user instructions input from a mouse 130 or a keyboard 120. Then, processing such as image retouching is performed on the original image data ORG according to the user instructions. The application program 95 displays processed images on the CRT display 21 via the video driver 91. Also, when printing instructions are received from the user, the application program 95 issues printing instructions to the printer driver 96, and supplies a processed image as initial image data PID to the printer driver 96.

The printer driver 96 receives the initial image data PID from the application program 95 and converts the PID to printing image data FNL that can be processed by the printer 22 (here, this means multi-valued signals for the seven colors cyan, magenta, yellow, black, light cyan, light magenta, and dark yellow).

With the example shown in FIG. 1, comprised within the printer driver 96 are a resolution conversion module 97, a color conversion/halftone module 99, and a rearranging module 100. The printer driver 96 further comprises a color conversion table 104, a load memory unit 105, a partial image data memory unit 106, and an error data memory unit 107.

The resolution conversion module 97 converts the initial image data PID into the image data MID 1 which has the resolution for printing with the printer 22. For color image printing, while referencing the color conversion table 104 which is a 3D lookup table, the color conversion/halftone module 99 converts the image data MID1 expressed by colors of each of the pixels with the RGB tone values to image data MID2 expressed by the colors of each pixel with the tone values of cyan (C), magenta (M), yellow (Y) and black (K) used by the printer 22. The color conversion/halftone module 99 may be referred as "the color conversion/HT module 99" in the specification.

By performing halftone processing on the image data MID2, for which the density of each color of each pixel is expressed by the tone values of each color, the color conversion/halftone module 99 converts the image data MID2 to image data MID3 (also called "printing data" or "dot data"), for which the density of each color is expressed by the presence or absence of dots for each pixel.

Note that the color conversion process and the halftone process are executed by the two threads 99b and 99c of the CPU. The functional units of the color conversion/halftone module 99 that achieve the functions of the color conversion process are shown as the color conversion modules 99d and 99e in FIG. 1. The functional units of the color conversion/halftone module 99 that achieve the functions of the halftone process are shown as halftone modules 99f and 99g in FIG. 1. The threads 99b and 99c of the CPU are described later.

The halftone process is also called the "binarization process." This halftone process is performed using the error diffusion method for cyan (C) and magenta (M), and performed using the dither method for yellow (Y) and black (K).

The "dither method" is a method that compares (a) an n×m dither matrix (n and m are positive integers) having respective thresholds within elements corresponding to each pixel and (b) image areas consisting of n×m pixels, and which determines the presence or absence of dot formation by whether or not the tone value held by each pixel of the image area is higher than the threshold. The "error diffusion method" is a method that determines the presence or absence of dot formation on one subject pixel based on the comparison of the tone value and the threshold, and that allocates the difference (error) between (a) density reproduction according to the presence or absence of dot formation and (b) the density specified by the tone value of multiple gradations, to other pixels that are not yet a subject pixel by addition of the error on the tone values of those pixels.

Generally, when doing halftone processing of the same data, the processing load is lower when performed using the dither method than when performed using the error diffusion method. However, the image printing result is generally of higher quality when the halftone processing is performed using the error diffusion method. Here, for cyan and magenta inks for which quality of the printing results are easier to see, the halftone processing is performed using the error diffusion method. For yellow ink, for which quality of the printing results is not easy to see, the halftone processing is performed using the dither method. For the other ink colors, the load that the overall halftone processing gives to the system is considered and a determination is made of which method to use.

The image data MID3 generated with the color conversion/halftone module 99 is rearranged by the rearranging module 100 into the data order in which to transfer to the printer 22, and is finally output as the printing image data FNL.

The printer 22 comprises a mechanism for conveying the paper P by a paper feed motor, a mechanism for moving the carriage 31 using a carriage motor back and forth in the direction MS which is perpendicular to the direction SS for the paper P conveyance, a printing head 28 incorporated on the carriage 31 for ink ejecting and dot formation, a P-ROM 42 for storing various types of setting data, and a CPU 41 for controlling the paper feed motor, the carriage motor, the printing head 28, the P-ROM 42, and an operating panel 32. The printer 22 receives the printing image data FNL, and executes printing by forming dots on the printing medium using various inks including cyan (C), magenta (M), yellow (Y) and black (K) according to the printing image data FNL.

Note that for this specification, "printing device" in a narrow sense indicates only the printer 22, but in a broad sense expresses the overall printing system including the computer 90 and the printer 22.

B2. Internal Structure of the CPU

CPU 90a of the computer 90 is a CPU that is compatible with hyper threading technology. This CPU 90a is capable of processing two threads in parallel. In FIG. 1, these two threads are indicated as first thread 99b and second thread 99c. Hereafter, the constitution and operation of the CPU 90a compatible with hyper thread technology is described.

Figure 2:
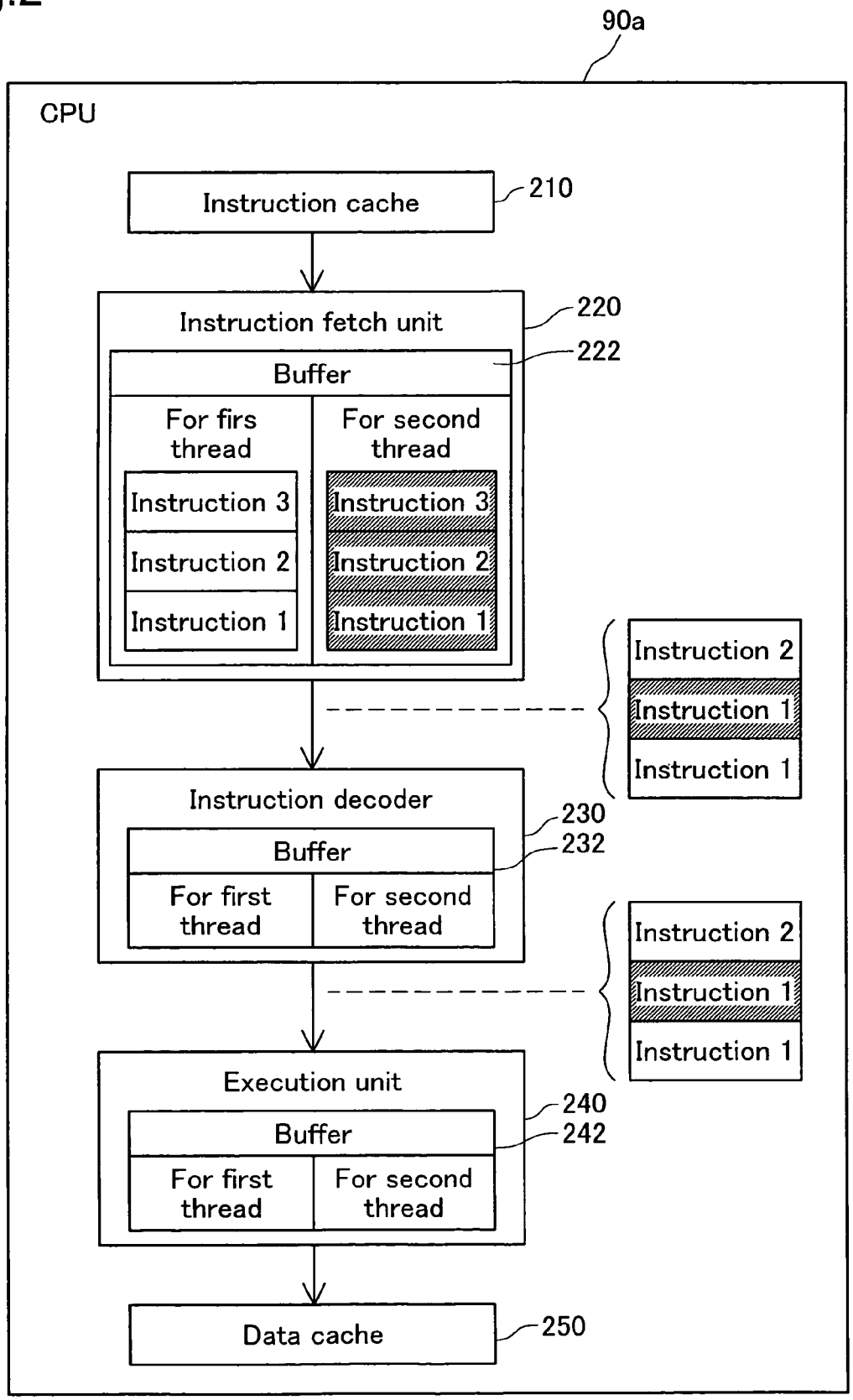
FIG. 2 is a block diagram showing the process within the CPU 90a of the computer 90.

FIG. 2 is a block diagram showing the process within the CPU 90a of the computer 90. The CPU 90a internally comprises an instruction fetch unit 220, an instruction decoder 230, an execution unit 240, an instruction cache 210, and a data cache 250. Then, the instruction fetch unit 220, the instruction decoder 230, and the execution unit 240 respectively comprise buffers 222, 232, and 242 for temporarily storing the processed instructions and data. The buffers 222, 232, and 242 are respectively divided for first thread use and for second thread use.

Stored in the instruction cache 210 are instructions that have already been used once and instructions that are expected to be used continuing after the used and stored instructions. The instruction fetch unit 220 specifies the address of the instruction cache 210 and fetches instructions. At that time, the first thread instructions are stored in the first thread buffer. The second thread instructions are stored in the second thread buffer. Note that when the required instruction is not within the instruction cache 210, the CPU 90a accesses the main memory (not illustrated) and fetches instructions.

After that, the instruction fetch unit 220 transfers the fetched instructions to the instruction decoder 230. At that time, one instruction of the first thread is sent to the instruction decoder 230 at odd numbered clock timing, and one instruction of the second thread is sent to the instruction decoder 230 at even numbered clock timing. Specifically, the first thread instruction and the second thread instruction are alternately sent to the instruction decoder 230. With FIG. 2, the second thread instruction is shown marked by hatching.

The instruction decoder 230 decodes and converts the sent instruction to microcodes, and stores them in the buffer 232. At this time, when the decoded instruction is a first thread instruction, the microcodes are stored in the first thread buffer. When the decoded instruction is a second thread instruction, the microcodes are stored in the second thread buffer.

After that, the instruction decoder 230 sends the decoded microcodes to the execution unit 240. At that time, one microcode of the first thread is sent to the execution unit 240 at odd numbered clock timing, and one microcode of the second thread is sent to the execution unit 240 at even numbered clock timing. The execution unit 240 performs the specified execution process, and the execution results are stored in the buffers for respective threads.

With the conventional CPU, the internal buffers in the instruction fetch unit 220, the instruction decoder 230, and the execution unit 240 are used altogether for one thread. When switching the thread being executed for a multi-thread process, the instruction decoder 230 and the execution unit 240 discard the previous thread instructions stored in the buffer until then, and need to receive the next thread instruction anew from the instruction fetch unit 220. Thus, the instruction decoder 230 and the execution unit 240 are idle until the instruction fetched by the instruction fetch unit 220 is newly supplied.

With the constitution of this embodiment of the present invention, the two threads alternately execute the microcodes. Also, the instructions or microcodes of the two threads are stored simultaneously within the buffers 222, 232, and 242 of the instruction fetch unit 220, the instruction decoder 230, and the execution unit 240. When the execution of one instruction of one of the threads ends, the instruction fetch unit 220, the instruction decoder 230, and the execution unit 240 are able to use the instructions of the other thread within the buffer immediately and can start handling of the next microcode. To say this in another way, it is possible to make effective use of the pipeline. Also, when an exception or wait occur with one thread, it is possible to proceed with processing with the other thread.

Note that the combination of the units that respectively store the first thread instructions or microcodes of the buffers 222, 232, and 242, and the functional units of the instruction fetch unit 220, the instruction decoder 230, and the execution unit 240 for processing those first thread instructions may be called the "thread processing unit" of the first thread. Similarly, the combination of the units that respectively store the second thread instructions or microcodes of the buffers 222, 232, and 242, and the functional units of the instruction fetch unit 220, the instruction decoder 230, and the execution unit 240 for processing those second thread instructions may be called the "thread processing unit" of the second thread.

B3. Color Conversion Processing and Halftone Processing

Figure 3:
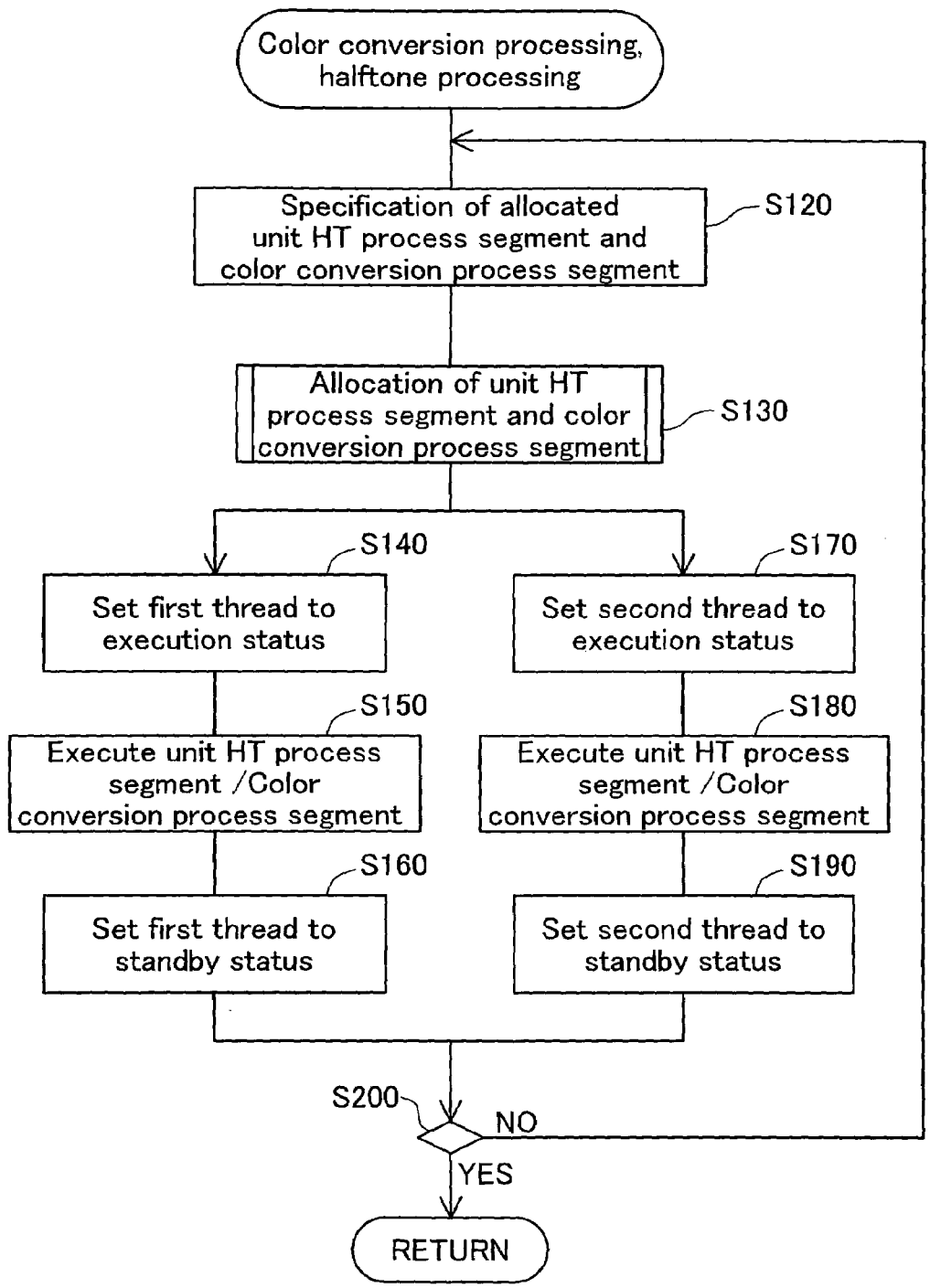
FIG. 3 is a flow chart showing the specific process flow of the color conversion process and the halftone process.
Figure 4:
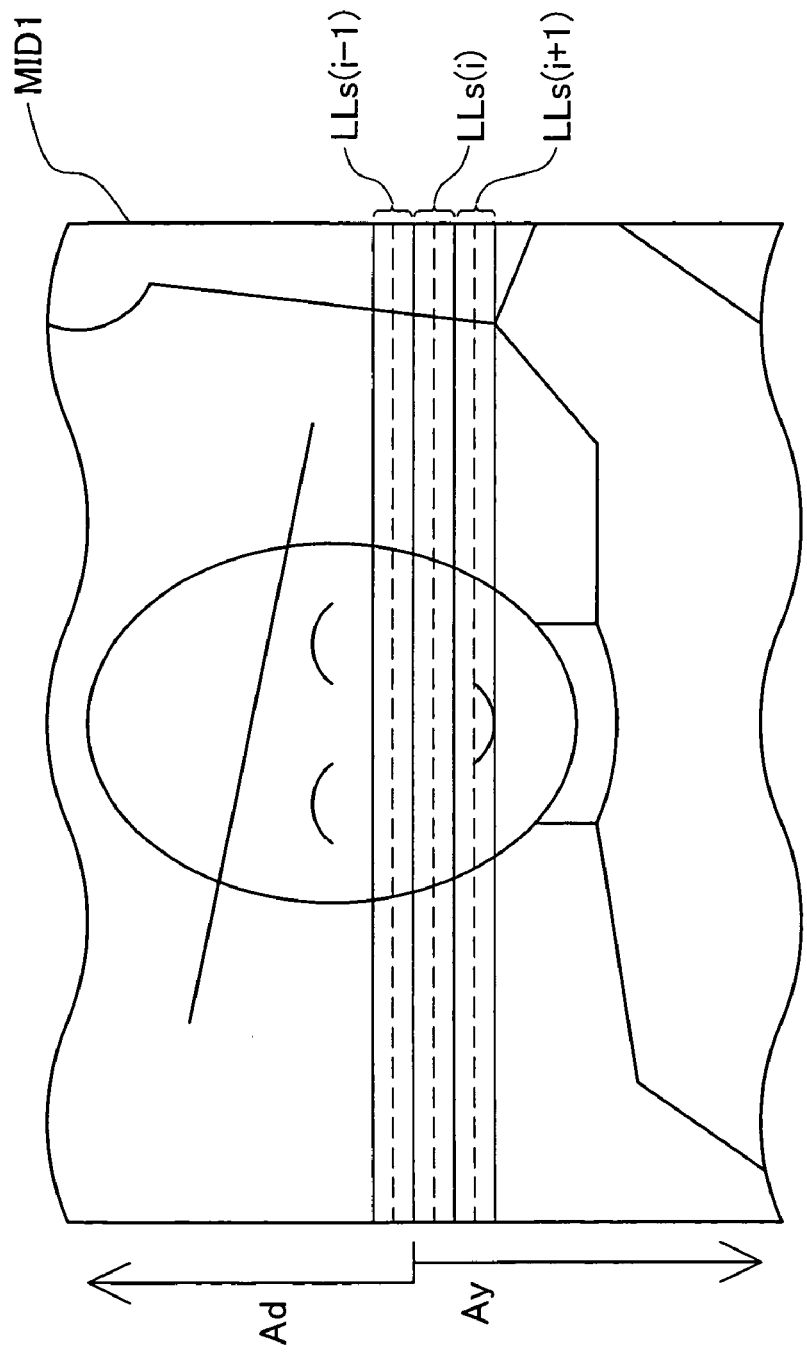
FIG. 4 shows the raster lines LLs (i) on which the color conversion process and the halftone process are performed.

FIG. 3 is a flow chart showing the specific process flow of the color conversion process and the halftone process. FIG. 4 shows the raster lines LLs (i) on which the color conversion process and the halftone process are performed. In specific terms, the color conversion process and the halftone process by the color conversion/halftone module 99 are performed each two raster lines in the image data MID1. Specifically, with each two raster lines as the partial image, the image data MID2 is transferred between the color conversion modules 99d and 99e and the halftone modules 99f and 99g (see FIG. 1).

Note that the images of the units for which this color conversion process and the halftone process are performed are called "partial images" in this specification. This word partial image is used for images of two lines of raster lines within the image data MID1 that is the subject of the color conversion process and is also used for images of two lines of the raster lines within the image data MID2 that is subject to the halftone process after the color conversion process. The area in which the partial image is represented is called a "partial image area." Then, the image data for representing the partial image that is subject to the color conversion process is called the "first partial image data." The image data for representing the partial image that is subject to the halftone process is called the "second partial image data."

In FIG. 4, the two raster lines for use in performing the color conversion process and the halftone process are indicated as the subject raster lines LLs (i). Also, in FIG. 4, the two raster lines for which the color conversion process and the halftone process were performed immediately prior are indicated as the reference raster lines LLs (i−1). The area Ad higher than subject raster lines LLs (i) is the area for which the color conversion process and the halftone process have already been performed. The subject raster lines LLs (i) and the area Ay lower than that are areas for which the color conversion process and the halftone process have not yet been performed. The two raster lines indicated as LLs (i+1) are the area for which the color conversion process and the halftone process are to be performed next of the subject raster lines LLs (i).

In executing the color conversion process and the halftone process, the color conversion process and C, M, Y, and K ink color halftone processing are distributed to the two threads and executed on each thread.

At step S120 in FIG. 3, first, the unit HT process segment and the color conversion process segment to be allocated to the threads are specified. With the first embodiment, the halftone process of each ink color of the subject raster lines LLs (i) and the color conversion process of the next raster lines LLs (i+1) of the subject raster lines LLs (i) are specified at step S120. Note that the color conversion process of the subject raster lines LLs (i) is executed in advance and already completed.

At step S130, the color conversion process and the halftone process for each ink color specified at step S120 are allocated to the two threads. The detailed contents of the processes will be described later. Here, as a result of the allocation at step S130, for example, the cyan unit HT process segment and the color conversion process segment are allocated to the first thread, and black, magenta, and yellow unit HT process segments are allocated to the second thread. After that, at step S140 and thereafter and S170 and thereafter, each process is executed respectively at the first and second threads.

Note that before steps S140 and S170, two threads are created in advance and go to a standby state. However, it is also possible to create threads every time the allocated processes is executed. Note that if threads are created in advance, it is possible to start processing in a short time, which is effective.

At step S140, the first thread that is in a standby state goes to an execution state. Then, at step S150, at the first thread, the allocated process, for example the color conversion process segment of the next raster lines LLs (i+1) and the unit HT process segment for cyan of the subject raster lines LLs (i) are performed. After that, at step S160, the first thread again goes to the standby state.

At step S150, the image data MID2 generated by the color conversion process segment is stored in the partial image data memory unit 106 (see FIG. 1) within the memory of the computer 90 as the respective image data of C, M, Y, and K.

Then, when the unit HT process segment of the raster lines LLs (i+1) is executed at step S150, the data of each color C, M, Y, and K of this subject raster lines LLs (i) is fetched from the partial image data memory unit 106 and used.

Also, at step S150, the difference (error) calculated for the unit HT process segment using error diffusion that is to be dispersed at the next raster lines LLs (+1) and thereafter is stored in the error data memory unit 107. That difference data is fetched and used at the time of the unit HT process segment for the same color as the next raster lines LLs (i+1).

Furthermore, at step S150, the time period required for each of the color conversion process segment and for the cyan unit HT process segment is counted, and is stored in the load memory unit 105 (see FIG. 1) within the memory of the computer 90.

Meanwhile, at step S170, the second thread that is in a standby state goes to an execution state. Then, at step S180, the allocated processes, e.g. halftone processing for magenta, yellow and black, is performed at the second thread. Then, when the halftone processing for each of these ink colors is finished, at step S190, the second thread again goes to a standby state. Note that at step S180, the time required for each halftone processing of magenta, yellow and black is counted, and is stored in the memory internal load memory unit 105 of the computer 90.

At step S200, a judgment is made of whether color conversion processing and halftone processing have finished for all the raster lines contained in the image data MID1. If the color conversion processing and halftone processing have not finished for all the raster lines, the process is repeated from step S120 with the two raster lines LLs (i+1) adjacent on the underside of the already processed raster lines LLs (i) as the new subject raster lines (see FIG. 4). If color conversion processing and halftone processing have ended for all the raster lines of the image data MID1, then processing ends.

Note that the processes of steps S120 and S130 are executed by the allocation unit 99a that is the functional unit of the color conversion/halftone module 99. Then, the processes of step S150 are executed by the color conversion module 99d and the halftone module 99f that are the functional units of the color conversion/halftone module 99. Meanwhile, the processes of step S180 are executed by the color conversion module 99e and the halftone module 99g that are the functional units of the color conversion/halftone module 99.

Figure 5:
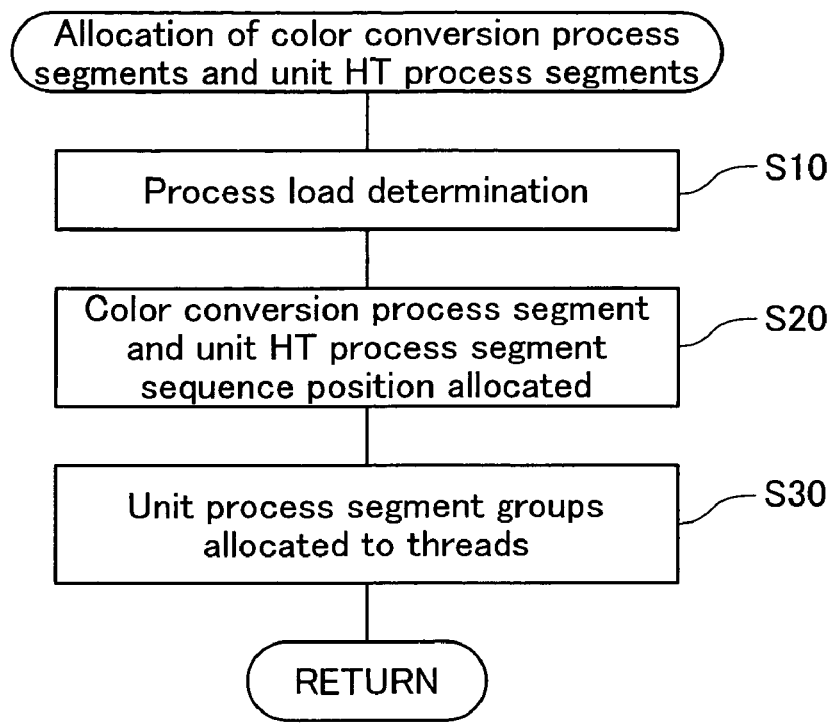
FIG. 5 is a flow chart showing the procedure for allocating the unit HT process segments of each color to the threads at step S130 of FIG. 3.

FIG. 5 is a flow chart showing the procedure for allocating the color conversion process segments and the unit HT process segments for each color to the threads for step S130 of FIG. 3. First, the load of the color conversion process segment and of each unit HT process segment for each color is estimated. Here, the previous processing time for each process stored in the load memory unit 105 is fetched, and that is used as the load of each process.

In the images, areas adjacent to each other often have mutually similar data value of each color component. Specifically, for the areas adjacent to each other, there is a high possibility of the halftone process load of the same colors being similar to each other. As described above, if the load of each unit HT process segment is determined based on the processing results of the reference raster lines LLs (i−1) for which halftone processing was performed immediately prior, it is possible to do accurate load estimation. From the same reason, if the load of the color conversion process segment of the raster lines LLs (i+1) is determined based on the processing results of the subject raster lines LLs (i) for which color conversion processing was performed immediately prior, it is possible to do accurate estimation of the color conversion process segment load.

Figure 6:
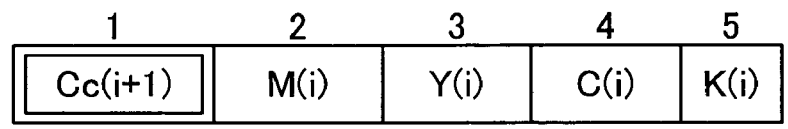
FIG. 6 shows the color conversion process segment and the unit HT process segments of each color allocated based on the load size.

FIG. 6 shows the color conversion process segment and the unit HT process segment of each color given a sequence position based on the load size. In FIG. 6, C (i), M (i), Y (i), and K (i) represent the unit HT process segment of each color for the subject raster lines LLs (i). Cc (i+1) represents the color conversion process segment for the next raster lines LLs (i+1). In FIG. 6, each square represents a unit HT process segment, and the length of the square in the lateral direction indicates the size of the load. A double square indicates the color conversion process segment Cc (i+1). In FIG. 6, the bigger a load is, the further to the left it is indicated. The number indicated above the square representing each unit HT process segment is the sequence position of the load size.

At step S20, the color conversion/halftone module 99 allocates sequence positions for color conversion process segments and unit HT process segments in order of decreasing loads for each process determined at step S10. Note that normally, the color conversion process segment has a bigger load than the unit HT process segment of each color. Accordingly, when the priority sequence determined at step S20, normally, the color conversion process segment has the first position.

FIG. 7 is an explanatory diagram showing the color conversion process segment and the unit HT process segment of each color allocated to the first and second threads. At step S30 of FIG. 5, the color conversion/halftone module 99 selects one each of the color conversion process segment and of each unit HT process segment following the sequence position determined at step S20, and allocates these to the first thread and the second thread. This is repeated, and each process specified at step S120 is allocated to a thread. In specific terms, after the process of the first position of the sequence (e.g. Cc(i+1)) is first allocated to the first thread, each of the processes that have not yet been allocated is allocated in order according to the priority sequence to a thread with the lowest total load of the already allocated unit HT process segments. As a result, the color conversion process segments and the unit HT process segments are allocated to the first and second threads as shown in FIG. 7.

With the first embodiment, in order from the process segments with the bigger load, these are allocated to the thread with the lower total load of the unit HT process segments that have been allocated up to that point. Accordingly, it is possible to equalize the variance of the loads between the threads.

By working as described above, the color conversion process segment allocation for step S130 of FIG. 3 is executed. Note that at steps S150 and S180 of FIG. 3, each unit HT process segment allocated to threads was executed in order from the left following the alignment sequence of FIG. 7 for each thread. Specifically, the earlier a unit HT process segment was allocated for allocation to the thread, the earlier it is executed for the actual color conversion process segment as well.

FIG. 8 is a Gantt chart showing the method of execution for processes allocated to the first and the second threads, i.e. the i-th to the (i+2)-th unit HT process segments and the (i+1)-th to the (i+3)-th color conversion process segments. Note that here, the overhead when switching processes and the skew of the estimated load and actual load are ignored. The Ge1 shown at the upper level is a drawing showing the results when each process is executed with the first embodiment by repeating the allocation for each of the partial images of FIG. 3. The alignment of the five process segments CC (i+1), C (i), M (i), Y (i), and K (i) at the upper left of FIG. 8 is the same as that of FIG. 7. Meanwhile, the Gc1 shown at the lower level of FIG. 8 shows the execution results of each process with the comparison example.

In the upper level of FIG. 8 the partial images that are subject to each process are shown as "LLs (i)+LLs (i+1)" etc. above the process allocated to the thread at the same time. For the first embodiment, as described with steps S200 and S120 of FIG. 3, when each unit HT process segment for the i-th partial image area LLs (i) and the color conversion process segment for the (i+1)-th partial image area LLs (i+1) end, next, each unit HT process segment for the (i+1)-th partial image area LLs (i+1) and the color conversion process segment for the (i+2)-th partial image area LLs (i+2) are allocated to each thread. The allocation procedure is as described in FIG. 5 to FIG. 7.

Also, with steps S150 and S180 of FIG. 3, immediately after the last of the unit HT process segments ends for the i-th partial image allocated previously, the next process is executed (see broken lines b11 and b12 of FIG. 8). For example, with the example shown in FIG. 8, immediately after the unit HT process segment K (i) for the i-th partial image ends, the next color conversion process segment Cc (i+2) and the unit HT process segment M (i+1) are executed.

Meanwhile, for the comparison example Gc1 shown in the lower level of FIG. 8, first, after the color conversion process segment of the partial image is executed by the first thread, the unit HT process segments of each ink color are executed with the first and second threads (see broken lines b31 and b32 of FIG. 8). For example, the unit HT process segments C (i+1), M (i+1), Y (i+1), and K (i+1) of the (i+1)-th partial image are executed after the color conversion process segment Cc (i+1) of the (i+1)-th partial image is executed. Note that the front-back positional constraints of the color conversion process segment and the unit HT process segments is indicated by the arrow that connects the color conversion process segment and each unit HT process segment in FIG. 8.

The same allocation method of the unit HT process segments of each color to the threads with the first embodiment is employed for the comparison example. That is, each unit HT process segment is allocated to the thread with the lowest total load of the unit HT process segments already allocated in order of decreasing load.

Also, with the comparison example, after the last of the unit HT process segments is completed, the next partial area color conversion process segment is executed (see broken lines b21, b22, and b23 of FIG. 8). For example, the color conversion process segment Cc (i+1) of the (i+1)-th partial image is executed after the completion of the C (i) that is the last unit HT process segment of the unit HT process segments of the i-th partial image. At the lower level of FIG. 8, under the processes allocated simultaneously to the thread, the partial image subject to each process is indicated by "LLs (i)" etc.

For the comparison example Gc1, the second thread is not used during the time that the first thread is performing the color conversion process segment of each partial image. In comparison to this, with the first embodiment Ge1, the unit HT process segments are being performed with the other thread while the color conversion is being performed. With the first embodiment, it is possible to effectively utilize a plurality of threads and efficiently perform processing. In specific terms, as shown in FIG. 8, for performing the same i-th to (i+2)-th partial image halftone processing and (i+1)-th to (i+3)-th partial image color conversion processing, the completion time was faster for the first embodiment compared to the comparison example by a time of time Tdf1.

Also, with the first embodiment, with the halftone processing for a certain partial image area LLs (i) and the color conversion processing for the next partial image area LLs (i+1) as one group, allocation to a thread and execution are performed simultaneously (step S120 of FIG. 3, see FIG. 6 to FIG. 8). As a result, the parallel processing of the color conversion process segment and the unit HT process segment are performed with a certain partial image unit HT process segment and the next partial image color conversion process segment. When viewed for one partial image, it is possible to increase the processing efficiency for each thread while maintaining the relationship of having the color conversion process segment executed first, and having the halftone processing pixel executed afterward. This front-back positional relationship (context) is indicated by the arrow that connects the color conversion process segment and each unit HT process segment in the upper level of FIG. 8.

C. Second Embodiment

With the second embodiment, the timing of the execution of processes allocated to each thread differs from that of the first embodiment. The other points are the same as the first embodiment.

Figure 9:
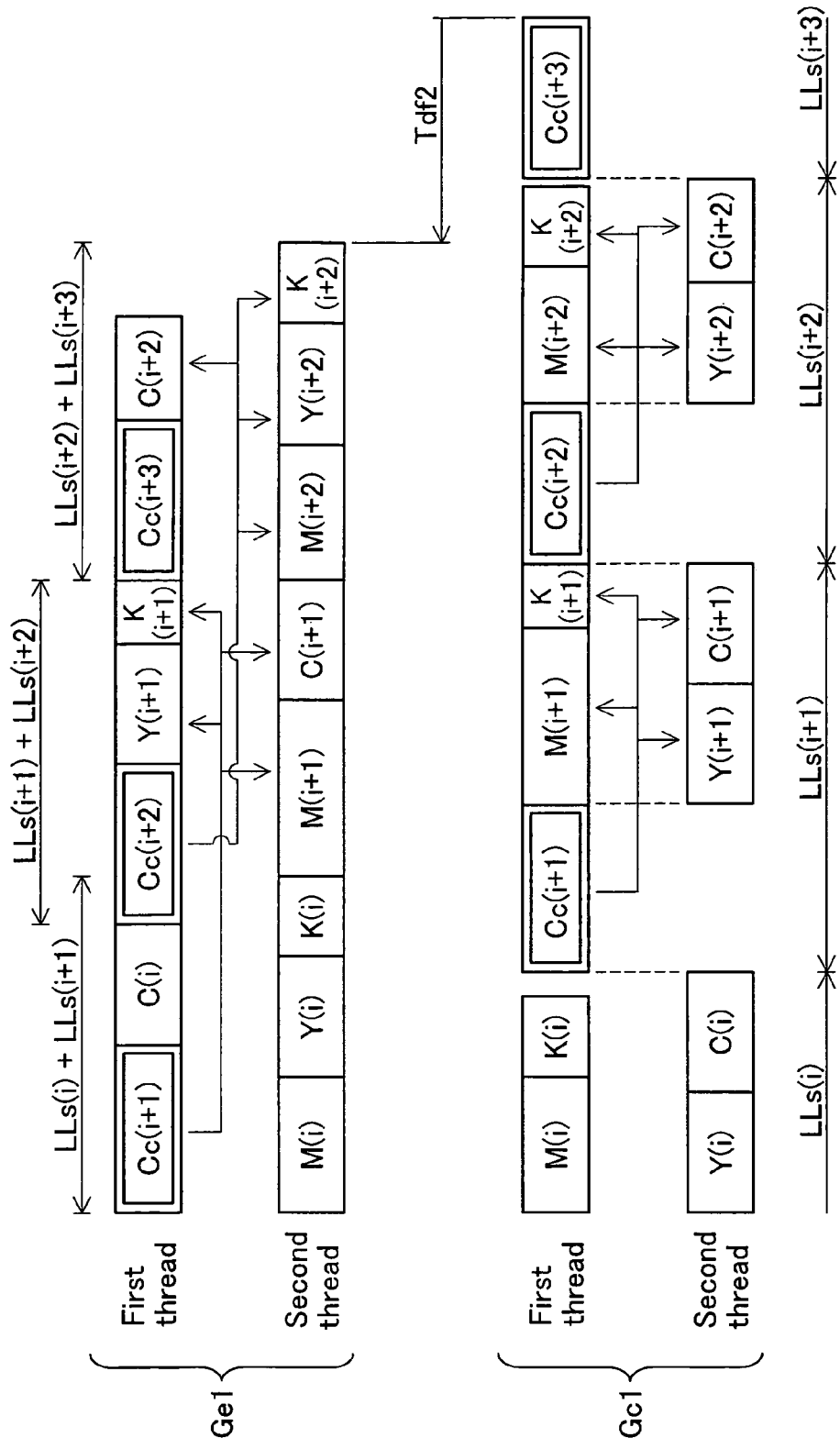
FIG. 9 is a Gantt chart showing the method of execution of the i-th to the (i+3)-th color conversion process segments and unit HT process segments allocated to the first and second threads for the second embodiment.

FIG. 9 is a Gantt chart showing the method of execution of processes allocated to the first and the second threads in the second embodiment, i.e. the i-th to the (i+2)-th unit HT process segments and the (i+1)-th to the (i+3)-th color conversion process segments. The notations are the same as those in FIG. 8. The comparison example Gc1 shown in the lower level of FIG. 9 is the same as that shown in the lower level of FIG. 8. With the first embodiment, process segment allocated to the threads simultaneously at step 130 in FIG. 3 such as Cc (i+2), C (i+1), M (i+1), Y (i+1), and K (i+1), for example, are executed after waiting for the completion of all the process-segments Cc (i+1), C (i), M (i), Y (i), and K (i) allocated immediately prior at step 130 (see the broken lines b11 and b12 in FIG. 8).

However, with the second embodiment, while the already allocated process segments Cc (i+1), C (i), M (i), Y (i), and K (i) are executed at the color conversion modules 99d and 99e and the halftone modules 99f and 99g, the allocation unit 99a performs the next process segments Cc (i+2), C (i+1), M (i+1), Y (i+1), and K (i+1) (see step 130 in FIG. 3). Then, the allocation results are stored within the memory of the computer 90.

Note that the processing time of the already completed process segments Cc (i), C (i−1), M (i−1), Y (i−1), and K (i−1) for the two prior partial images are used as the estimated load of each process used during allocation (see step S10 of FIG. 5). Accordingly, in the second embodiment, the following processing time are stored in the load memory unit 105, i.e. the processing time of the already completed process segments C (i), C (i−1), M (i−1), Y (i−1), and K (i−1) and the processing time of the process which has already been completed among the currently executing process segments Cc (i+1), C (i), M (i), Y (i), and K (i).

After that, when processes to be executed have run out for any of the threads, execution of processes segment allocated to that thread is started according to the allocation results stored in the memory. With the example in FIG. 9, after completion of C (i) at the first thread, without waiting for completion of K (i) at the second thread, the color conversion process segment Cc (i+2) is executed immediately. Note that during the time that the unit HT process segment K (i) and the color conversion process segment Cc (i+2) are undergoing parallel processing, the image data MID2 for the two partial images are stored in the partial image data memory unit 106 (see FIG. 1). Specifically, this is the image data MID2 of the partial image area LLs (i+1) generated by the color conversion process segment Cc (i+1) first, and the image data MID2 of the partial image area LLs (i+2) generated partially by the currently executing color conversion process segment Cc (i+2).

By using the aspect in the second embodiment, it is possible to start any of the next process segments Cc (i+2), C (i+1), M (i+1), Y (i+1), and K (i+1) at the time of the completion of the process segments Cc (i+1), C (i), M (i), Y (i), and K (i) for each thread. Accordingly, it is possible to more effectively utilize the threads, and to efficiently perform the color conversion process and the halftone process.

To say this another way, with the comparison example Gc1 shown in the lower level of FIG. 9, the unit HT process segment and the, color conversion process segment are not processed in parallel. In comparison to this, with the second embodiment, while the unit HT process segment of the i-th partial image is being executed for a certain thread, at the other thread, the color conversion process segments of the (i+1)-th and the (i+2)-th partial images are being performed (see FIG. 9 Cc (i+1), Cc (i+2)). Accordingly, it is possible to more effectively utilize the threads and to efficiently perform the color conversion process and the halftone process. For example, as shown in FIG. 9, to do the same halftone processing of the i-th to the (i+2)-th partial image and the color conversion processing of the (i+1)-th to the (i+3)-th partial images, compared to the comparison example, with the second embodiment, the completion time is faster by a time of Tdf2.

D. Third Embodiment

With the third embodiment, while actually executing the color conversion process segment or the unit HT process segment, the next unit HT process segment to be executed is determined. The third embodiment is the same as the first embodiment except for the allocation and execution method of the color conversion process segments and the unit HT process segments to the threads.

Figure 10:
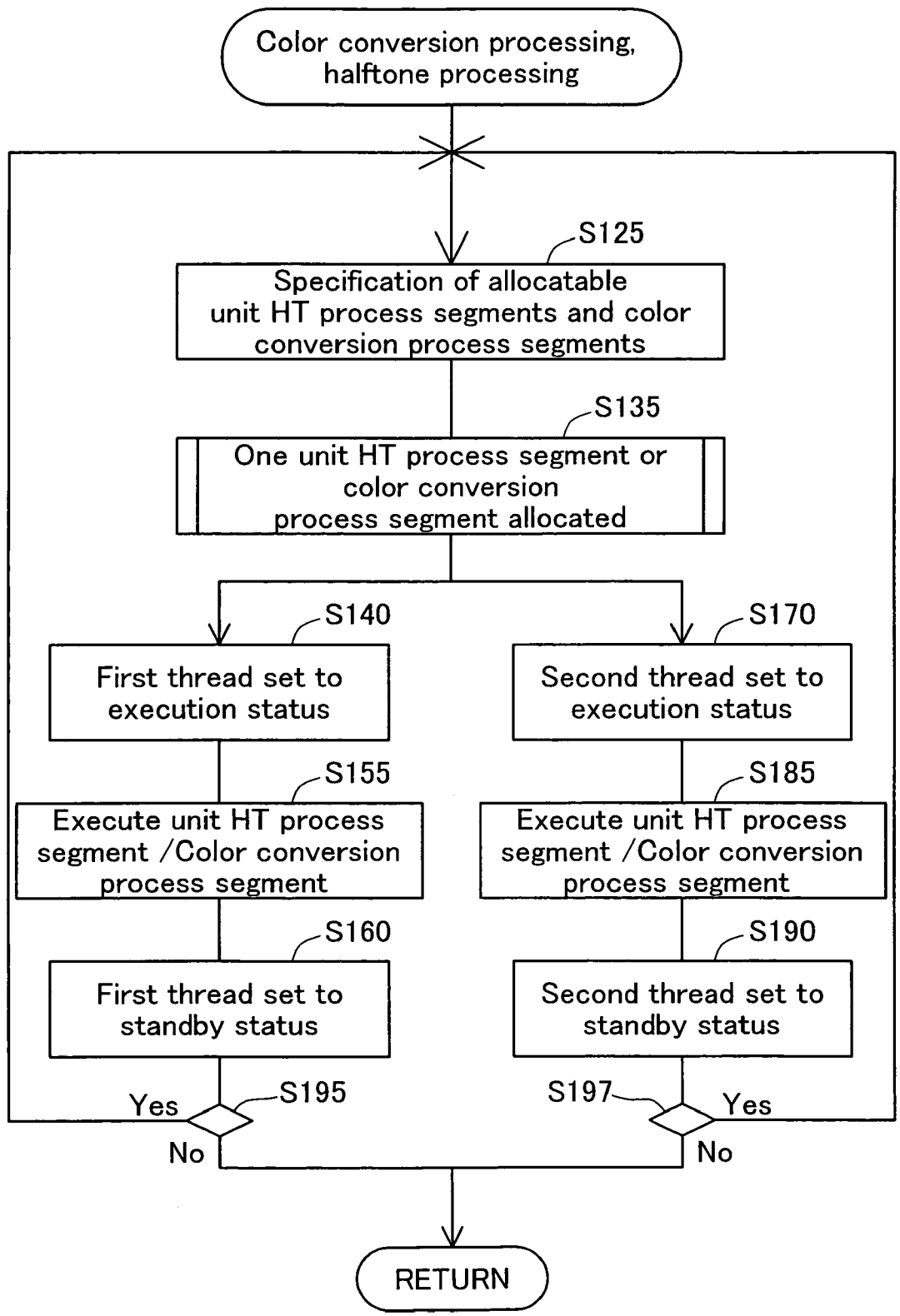
FIG. 10 is a flow chart showing the specific processing flow of the color conversion processes and the halftone processes for the third embodiment.

FIG. 10 is a flow chart showing the specific process flow of the color conversion process and the halftone process with the third embodiment. With the third embodiment, instead of the method of FIG. 3 for the first embodiment, the color conversion process segments and the unit HT process segments are allocated and executed to the threads using the method shown in FIG. 10.

At step S125 of FIG. 10, the color conversion process segments and the unit HT process segments that can be allocated to the threads are specified. The "color conversion process segments and the unit HT process segments that can be allocated to the threads" are the processes that satisfy the following conditions when all of the unit HT process segments up to the (i−1)-th partial image area LLs (i−1) and the color conversion process segments up to the i-th partial image area LLs (i) are completed. Specifically, these are the process segments that satisfy specified conditions among the unit HT process segments of the i-th to (i+1)-th partial images and the color conversion process segments of the (i+1)-th to the (i+2)-th partial image. The specified conditions are that either (1) the unit HT process segments using the dither method or (2) the unit HT process segments using the error diffusion method and the preceding partial images be completed at the start schedule time of the process segment for which allocation is currently being examined.

As described above, the difference (error) between the density expression according to the presence or absence of dot formation and the density specified by tone values is distributed to other pixels that are not yet a subject pixel. In the unit HT process segments using the error diffusion method, in a state for which the unit HT process segmenting has not ended for the areas before the areas that are subject, the errors from the prior area have not been added to the tone values of the target area. Accordingly, in a state for which the unit HT process segmenting has not ended for the areas before the target area, the unit HT process segment cannot be executed. In contrast to this, the unit HT process segments executed using the dither method can be executed even in a state for which the unit HT process segmenting has not ended for the areas before the target areas. At step S125, the unit HT process segments specified as "processes that can be allocated" are the processes that are executed using the dither method and also the unit HT process segments executed using the error diffusion method and which the unit HT process segments has been completed for the preceding partial images.

Figure 11:
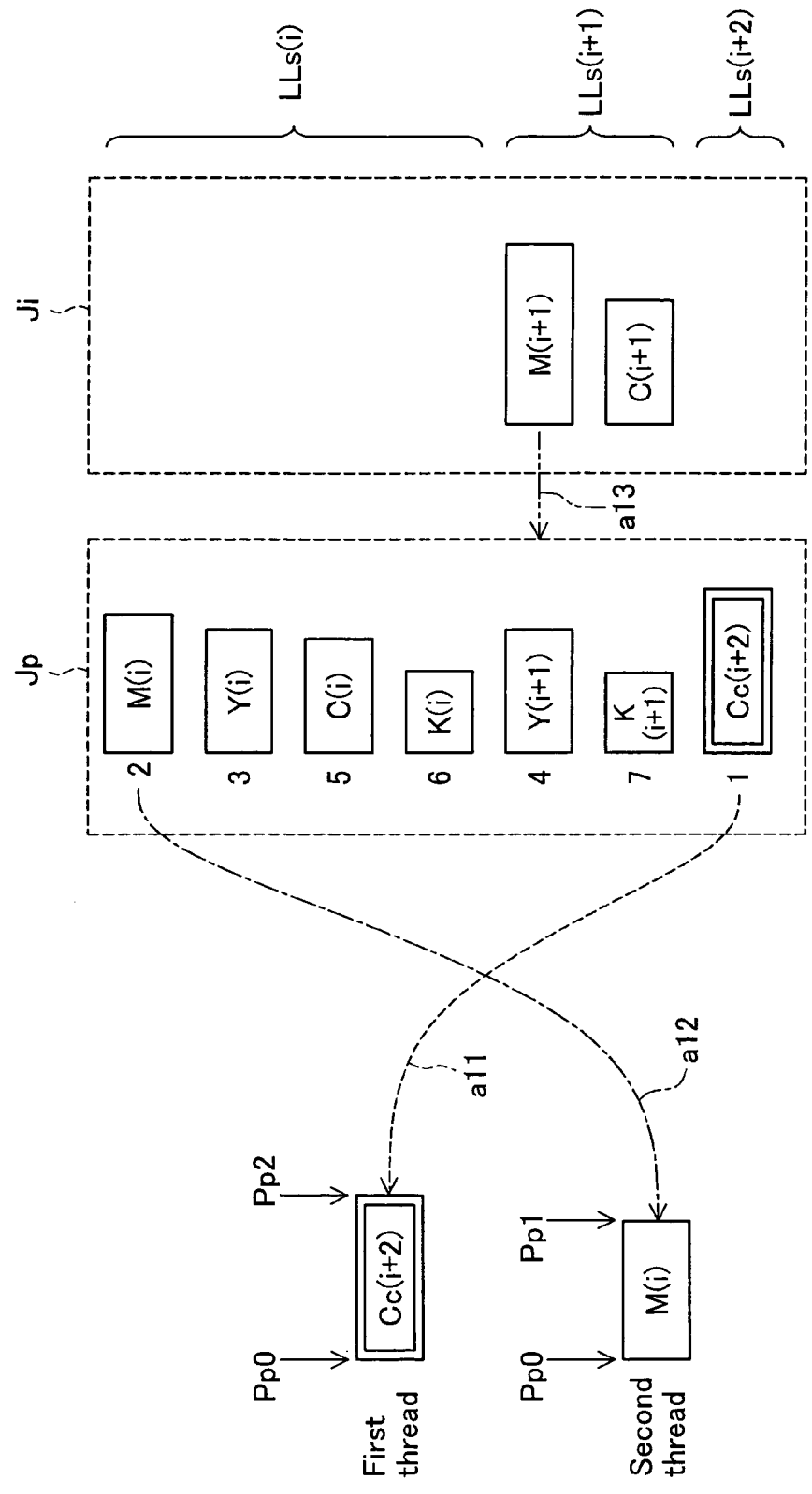
FIG. 11 shows the method of allocating processes to the threads for the third embodiment.

FIG. 11 shows the method of allocating processes to the threads for the third embodiment. With the third embodiment, the halftone process is performed using the error diffusion method for cyan (C) and magenta (M), and performed using the dither method for yellow (Y) and black (K). The color conversion process segment Cc (i+1) of the (i+1)-th partial image has been completed already up to then. Thus, at step S125, the specified process segments are the color conversion process segment Cc (i+2) of the (i+2)-th partial image, Y (i), K (i), Y (i+1), and K (i+1) which are unit HT process segments executed using the dither method, and M (i) and C (i) which are unit HT process segments executed using the error diffusion method and for which the process of the immediately prior partial image is completed. These are indicated as allocatable process segments Jp in FIG. 11.

Meanwhile, even for unit HT process segments of the i-th to (i+1)-th partial images, the items which are unit HT process segments that are executed using the error diffusion method and for which the processing of the immediately prior partial image is not completed are indicated as unallocatable process segments Ji in FIG. 11. Note that, on the right side of FIG. 11, the partial image areas LLs (i) to LLs (i+2) are shown which are subject to the respective processes.

At step 135 in FIG. 10, of the allocatable process segments Jp, the process with the biggest load is allocated to the thread for which the processes to be executed run out first. The estimated load of each process segment can be determined based on the execution results of the same type of process segment that was completed immediately prior. In specific terms, the estimated load of the color conversion process segment is the processing time of the color conversion process segment completed immediately prior. The estimated load of the unit HT process segment is the processing time of the unit HT process segment of the same color that was completed immediately prior.

At step S135, for example as shown by arrow a11 of FIG. 11, the color conversion process segment Cc (i+2) is allocated as the process starting from the time Pp0 to the first thread. In FIG. 11, the sequence of the respective load sizes are shown at the left side of the allocatable process segments Jp.

At step S140, the first thread which is in a standby state is set to an execution state. Then, at step S155, the color conversion process segment Cc (i+2) is executed at the first thread. After that, at step S160, the first thread is again set to a standby state. Note that the processes at steps S140 and S160 are the same as the first embodiment.

At step S195, a determination is made of whether or not there is color conversion process segment or unit HT process segment that are not yet allocated to a thread. When there is process segment that has still not been allocated, the process returns to step S125. When all of the unit HT process segments have been allocated to either the first or the second thread, the processing ends.

At step S125, once again, the color conversion process segments and the unit HT process segments that can be allocated to threads are specified. At this point in time, specified as the color conversion process segments and the unit HT process segments that can be allocated to the threads are the first Jp process segments shown in FIG. 11 that are process segments other than the color conversion process segment Cc (i+2) already allocated to a thread. Then, at step S135, as shown by the arrow a12 of FIG. 11, the unit HT process segment M (i) is allocated to the second thread as a process starting from the time Pp0.

Then, at steps S170 to S190, the unit HT process segment M (i) is executed at the second thread. The procedures for the steps S170 to S190 relating to the second thread are respectively the same as the procedures for the steps S140 to S195 relating to the first thread. The end time of each process is indicated as Pp1 and Pp2 in FIG. 11.

When the unit HT process segment M (i) using the error diffusion method is completed at the time Pp1, it becomes possible to execute the magenta unit HT process segment M (i+1) for the next partial image. As a result, when the next step S125 is executed, as shown by the arrow a13, the unit HT process segment M (i+1) is included in the new allocatable process segments Jp. The same is true when the unit HT process segment C (i) is completed.

After that, when all of C (i), M (i), Y (i), and K (i) are completed, the unit HT process segments of up to the i-th partial image and the color conversion process segment Cc (i+1) of up to the (i+1)-th partial image are all completed. Then, the unit HT process segments Y (i+2) and K (i+2) executed using the dither method and the color conversion process segment Cc (i+3) are newly added to the allocatable process segments Jp. Hereafter, in the same way, allocation and execution of processes is performed up to the completion of all of the color conversion process segments and the unit HT process segments.

With the aspect of the third embodiment as well, it is possible to effectively utilize a plurality of threads to efficiently perform color conversion processing and halftone processing. In particular, with the third embodiment, when allocating and executing the unit HT process segments of the i-th partial images, simultaneously, part of the unit HT process segment of the (i+1)-th partial image and the color conversion process segment of up to the (i+2)-th partial images are subject to selection. Accordingly, by utilizing a large number of choices, it is possible to achieve a higher level of equalization of the load of each thread and to make processing more efficient.

E. MODIFICATIONS

Note that the present invention is not limited to the aforementioned examples and embodiments, and can be implemented in various aspects in a scope that does not stray from the key points, with the following variations being possible, for example.

E1. Modification 1

With the first embodiment, the process segments allocated at steps S120 and S130 were the halftone processes of each ink color of the subject raster lines LLs (i) and the color conversion process of the next raster lines LLs (i+1) of the subject raster lines LLs (i) (see step S120 of FIG. 3). Also, with the third embodiment, the processes selected as allocatable processes at step S125 were the process segmenmts among the unit HT process segments of the i-th to the (i+1)-th partial images that satisfy specified conditions and the color conversion process segments of the (i+1)-th to the (i+2)-th partial images. However, it is also possible to include other process segments for the process segments subject to allocation. For example,.it is possible to include the color conversion process segments of the (i+3)-th to the (i+4)-th partial images. It is also possible to include process segments among the unit HT process segments of the (i+2)-th or the (i+3)-th partial images that satisfy specified conditions.

Specifically, the process segments subject to allocation may include the following processes when the unit HT process segments up to the (i−1)-th (i is an integer of 2 or greater) partial image and the color conversion process segments up to the i-th partial image are all completed. Specifically, the group of process segments subject to allocation may include process segments that are the second-type process segments relating to the i-th partial images but that have not yet been allocated to a processing unit and the first-type process segments relating to the (i+1)-th to the (i+p)-th (p is a positive integer) partial images that have not yet been allocated to a processing unit. The first-type process segments must be process segments that are completed before the second-type process segments relating to the same partial image.

It is preferable that p be 4 or less, and more preferable that it be 3 or less. Then, it is even more desirable that p be 2 or less. If these aspects are used, it is possible to reduce the capacity of the memory unit for holding the second partial image data generated after the first-type process segment.

Also, the process segments subject to allocation may include the following process segments when the unit HT process segments up to the (i−1)-th partial image and the color conversion process segments up to the i-th partial image are all completed. Specifically, these are restricted process segments relating to the (i+1)-th to the (i+q)-th (q is a positive integer) partial images, that are not yet allocated to a processing unit, and that are restricted processes for which the same type of restricted process relating to the immediately prior partial image is completed at the scheduled time for starting the execution of processing of the subject processing group. Here, the restricted process is a process that is executable only after the same type of restricted process relating to the immediately prior partial image is completed.

It is preferable that q be 4 or less, and more preferable that it be 3 or less. Then, it is even more preferable that q be 2 or less. If these aspects are used, it is possible to decrease the capacity of the memory unit for holding the difference (error) generated after the unit HT process segmenting using the error diffusion method as the second-type process segment.

E2. Modification 2

With the embodiments noted above, there were two threads. However, it is also possible to set three or more threads. However, with each of the aforementioned aspects of the present invention, it is especially effective to use these when the number of threads for executing the unit process segments is lower than the number of unit process segments. For aspects with three or more threads, when allocating the unit HT process segments in advance, it is preferable to allocate one of the unit process segments not yet allocated to a thread to the thread with the lowest total load of already allocated unit process segments from among the three or more threads. Then, in case allocating unit HT process segments while executing halftone process segment, it is preferable to allocate unit process segments to the thread for which executions of already allocated unit process segments were completed the earliest from among the three or more threads.

With each of the embodiments noted above, one CPU of the computer executes unit HT process segments with a plurality of threads using hyper threading. However, the unit HT process segments can also be distributed to a plurality of CPUs and executed. With this aspect as well, using the same procedure as each of the aforementioned embodiments, it is possible to allocate each of the unit HT process segments to each of the CPUs so that the variation of the load between the CPUs is reduced.

Also, with each of the embodiments noted above, the threads were fixed at two threads. However, it is also possible to use an aspect for which it is possible to change according to circumstances the number of threads generated for the hyper threading or the number of CPUs used for multi-CPU computers. For example, the image processing device, which is one embodiment of the present invention, may use an aspect having a plurality of operating modes such as an operating mode having one thread, an operating mode having two threads, and an operating mode having three threads. When there are two or more processing units such as the thread or CPU, it is possible to perform load allocation and execution sequence determination using the same procedures as each of the embodiments noted above. When there is one processing unit, it is possible to have an aspect that executes each of the unit process segments on that processing unit following the pre-determined sequence.

E3. Modification 3

For the aforementioned embodiments, when estimating the load of each process segment, the processing time of each process segment for the area for which processing was performed immediately prior was used as the corresponding process segment load. However, it is also possible to perform process segment load estimation based on other values. For example, it is possible to use the dot generation volume or dot generation probability of each ink color within the area LLs (i−1) for which halftone processing was performed immediately prior as the load of each unit HT process segment for the area LLs (i) for which the halftone processing is performed next. When doing that, it is possible to have the estimated load of the color conversion process segment be a specified fixed value. For this aspect, allocation to threads is performed from the items for which the dot generation volume or dot generation probability is higher for the immediately prior area LLs (i−1) (see FIG.7 and FIG. 11).

Also, for the unit HT process segments and the color conversion process segments for which the halftone processing method is the same, it is also possible to set the load uniformly. For example, it is possible to set 1 for the load of the unit HT process segments for which the halftone process is performed using the dither method, to set 3 for the load for the unit HT process segments for which the halftone process is performed using the error diffusion method, and to set 5 for the load of the color conversion process segment. Furthermore, it is also possible to set the load based on the kind of the halftone processing method, the processing time, dot generation volume and/or generation probability described above. For example, it is possible to set the load of the unit HT process segment for which the halftone process is performed using the dither method to 1× "dot generation probability" and to set the load of the unit HT process segment for which the halftone process is performed using the error diffusion method to 3× "dot generation probability." When doing that, it is possible to have the color conversion process segment load be a fixed value. Specifically, it is possible to have the estimate of the unit process segment load be determined considering the execution results of each unit process executed immediately prior.

E4. Modification 4

With the first embodiment noted above, each process is executed in the allocation sequence for the allocation to the threads. However, it is also possible to perform scheduling that determines the execution sequence within a plurality of process segments allocated as one group simultaneously (See Step S120 in FIG. 3), separate from the allocation of processes to each thread. Specifically, for allocation of processes to each processing unit, if allocation of process segments with a relatively small load is executed after the process segments with a relatively big load, and one process segment at a time is allocated to the processing unit with the smaller total load allocated up to that point, it is possible to perform allocation with little variation of load between the processing units.

E5. Modification 5

When the printer 22 which receives the printing image data FNL is able to form dots of a plurality of types of sizes such as large, medium, small for the same ink color, the halftone processing is performed using units of each dot type for each ink color. With each of the embodiments noted above, the unit HT process segments were halftone processes for each ink color, but for this aspect, it is possible to have the unit HT process segment be halftone processing in units of each dot type for each ink color.

E6. Modification 6

With each of the embodiments described above, four types of ink, cyan (C), magenta (M), yellow (Y), and black (K), were used as inks. However, it is also possible to use chromatic color inks other than these such as read (R), violet (V) etc., or chromatic color inks with different thickness such as light cyan (LC), light magenta (LM), dark yellow (DY) etc. Note that "light cyan" is ink that is the same hue as cyan but of a lighter color than cyan. "Light magenta" is ink of the same hue as magenta but of a lighter color than magenta. "Dark yellow" is ink of the same hue as yellow but of a darker color than yellow.

Also, as ink, it is possible to use achromatic colors of different density, including black (K1), light black (K2), and light light black (K3). Furthermore, it is possible to use clear ink. Specifically, as ink, it is possible to use various colored inks, and for the halftone process to include unit HT process segments for the various ink colors. Specifically, the types of ink colors can be 2 or more, and the second partial image data representing a partial image, which is generated by performing the first-type process segment on the first partial image, can be 2 or more types of partial image data. However, when processing a color image, the second partial image data is preferably 3 types or more.

E7. Modification 7

With each of the aforementioned embodiments, as the processes for which parallel processing is executed using threads, examples of color conversion processing and halftone processing were explained. However, it is also possible to use other processes as the process for which parallel processing is performed using a plurality of processing units. For example, it is also possible to do parallel processing of a process for extracting red image data of tone values for representing red contrasting densities, green image data of tone values representing green contrasting densities, and blue image data of tone values representing blue contrasting densities, and a process for performing tone value conversion on each of the generated image data.

Specifically, the first-type process segment can be a process that is executed on the first partial image data for representing a partial image, and that generates mutually different M types (M is an integer of 2 or greater) of second partial image data. Then, the second-type process segment can be an image process executed respectively on the aforementioned M types of second partial image data. Here, the M types of second partial image data can be image data represented by mutually differing color contrasting densities.

E8. Modification 8

With the aforementioned embodiments, it is also possible to replace part of the constitution realized using hardware with software, and conversely, to replace part of the constitution realized using software with hardware. For example, it is also possible to have the CPU 41 of the printer execute part of the functions of the printer driver 96 (see FIG. 1).

A computer program for realizing these functions are provided in a format recorded on a computer readable recording medium such as a floppy disk, a CD-ROM, etc. The host computer reads the computer program from that recording medium and transfers it to either an internal storage device or an external storage device. Alternatively, it is also possible to supply the computer program to the host computer from a program supply device via a communication path. When realizing the computer program functions, the computer program stored in the internal storage device is executed by the microprocessor of the host computer. It is also possible to have the host computer directly execute the computer program recorded in the recording medium.

With this specification, a computer is a concept that includes a hardware device and an operating system, and means a hardware device that operates under the control of the operating system. The computer program executes the functions of each part described above on this kind of computer. Note that part of the functions described above may also be realized not by a driver or an application program but rather by the operating system.

Note that with this invention, a "computer readable recording medium" is not limited to a portable type recording medium such as a flexible disk or a CD-ROM, but also includes internal storage devices within the computer such as various types of RAM or ROM or the like, and external storage devices fixed to a computer such as a hard disk.

The Program product may be realized as many aspects. For example:
(i) Computer readable medium, for example the flexible disks, the optical disk, or the semiconductor memories;
(ii) Computer including the computer readable medium, for example the magnetic disks or the semiconductor memories; and
(iii) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An image processing method comprising:
   executing first-type processing on a first partial image data representing a partial image to generate a second partial image data;
   executing second-type processing on the second partial image data; and
   repeating the execution of the first and second-type processing on a plurality of partial images aligned to be adjacent to each other using a plurality of processing units, wherein
   a first-type process segment and a second-type process segment are executed parallel using the plurality of processing units, the first-type process segment relating to i-th partial image, and the second-type process segment relating to a partial image that is selected based on an estimated load from among the (i+1)-th to (i+p)-th partial images, where i is a positive integer, and p is a positive integer.

2. The method recited in claim 1, wherein
   the first-type process segment converts the first partial image data represented by a first color system into image data represented by a second color system having M color components to generate M types of the second partial image data corresponding to the color components, and
   the second-type process segment is halftone processing, where M is an integer of 2 or greater.

3. The method recited in claim 1 further comprising:
   (a) allocating process segments of a subject process segment set to the plurality of processing units in sequence, the subject process segment set including:
      at least one second-type process segment which relates to i-th partial image but has not yet been allocated to one of the processing units; and
      a plurality of first-type process segments which relate to (i+1)-th to (i+p)-th partial images but have not yet been allocated to the processing units; and
   (b) executing the first and second-type process segments in the allocated sequence on allocated processing units respectively, where i is a positive integer, and p is a positive integer.

4. The method recited in claim 3, further comprising
   (c) before the step (a), estimating a load of the first-type process segment of the subject process segment set based on execution results of a preceding first-type process segment; and estimating a load of the second-type process segment of the subject process segment set based on execution results of a preceding second-type process segment of same type, wherein
   the step (a) comprises:
   (a1) selecting one process segment included in the subject process segment set according to a priority sequence of decreasing estimated loads; and allocating the selected process segment to a processing unit with a lowest total estimated load of process segments already allocated, and
   (a2) repeating the step (a1).

5. The method recited in claim 1 further comprising:
   (a) selecting one process segment from among a subject process segment set including: at least one second-type process segment which relates to i-th partial image but has not yet been allocated to one of the processing units; and a plurality of first-type process segments which relate to (i+1)-th to (i+p)-th partial images but have not yet been allocated to the processing units; allocating the selected process segment to one of the plurality of processing units; and executing the selected process segment on the allocated processing units; and (b) repeating the step (a), where i is a positive integer, and p is a positive integer.

6. The method recited in claim 5, further comprising:

(c) before the step (a), estimating a load of the first-type process segment of the subject process segment set based on execution results of a preceding first-type process segment; and estimating a load of the second-type process segment of the subject process segment set based on execution results of a preceding second-type process segment of same type, wherein the step (a) comprising:

selecting a process with a biggest of the estimated loads within the subject process segment set;

allocating the selected process segment to a processing unit for which processes to be executed first run out; and executing the selected process on the processing unit.

7. The method recited in claim 3, wherein the performing a first-type process segment includes generating M types of the second partial image data by performing the first-type process segment on the first partial image data, the performing a second-type process segment includes performing corresponding M types of the second-type process segment on the M types of the second partial image data respectively, the M types of the second partial image data includes a restricted process which is executable only after same type of process relating to a partial image immediately prior is completed, and the subject process segment set further comprises a restricted process that relates to one of the (i+1)-th to (i+q)-th partial images;

has not yet been allocated to one of the processing units; and when it is assumed that the restricted process has been allocated to one of the processing units, a same type of restricted process relating to immediately prior partial image is completed at a scheduled time for starting execution of the restricted process, where M is an integer of 2 or greater, q is a positive integer.

8. The method recited in claim 7, wherein the subject process segment set further comprises a process that is a non-restricted process that is not the restricted process among the second-type process segments;

relates to one of the (i+1)-th to (i+q)-th partial images; and has not yet been allocated to one of the processing units, q is a positive integer.

9. The method recited in claim 8, wherein the first-type process segment converts the first partial image data represented by a first color system into image data represented by a second color system having M color components to generate M types of the second partial image data corresponding to the color components, and the second-type process segment is halftone processing, the restricted process is a halftone process performed using an error diffusion method, and the non-restricted process is a halftone process performed using a dither method, where M is an integer of 2 or greater.

10. An image processing device for image processing comprising:

a plurality of processing units for repeating execution of first and second-type processing on a plurality of partial images aligned to be adjacent to each other, wherein the first-type processing is executed on a first partial image data representing a partial image to generate a second partial image data, the second-type processing is executed on the second partial image data, and a first-type process segment and a second-type process segment are executed parallel using the plurality of processing units, the first-type process segment relating to i-th partial image, and the second-type process segment relating to a partial image that is selected based on an estimated load from among the (i+1)-th to (i+p)-th partial images, where i is a positive integer, and p is a positive integer.

11. The image processing device recited in claim 10 executing the first and second-type process segments by hyper threading, wherein each of the processing units is a thread processing unit for processing thread.

12. The image processing device recited in claim 10 in the first-type process segment, the first partial image data represented by a first color system is converted into image data represented by a second color system having M color components to generate M types of the second partial image data corresponding to the color components, and the second-type process segment is halftone processing, where M is an integer of 2 or greater.

13. The image processing device recited in claim 10 further comprising:

an allocation unit for allocating process segments of a subject process segment set to the plurality of processing units in sequence, the subject process segment set including:

at least one second-type process segment which relates to i-th partial image but has not yet been allocated to one of the processing units; and a plurality of first-type process segments which relate to (i+1)-th to (i+p)-th partial images but have not yet been allocated to the processing units; and an execution unit for executing the first and second-type process segments in the allocated sequence on allocated processing units respectively, where i is a positive integer, and p is a positive integer.

14. The image processing device recited in claim 10 further comprising:

an allocation unit for selecting one process segment from among a subject process segment set including: at least one second-type process segment which relates to i-th partial image but has not yet been allocated to one of the processing units; and a plurality of first-type process segments which relate to (i+1)-th to (i+p)-th partial images but have not yet been allocated to the processing units;

allocating the selected process segment to one of the plurality of processing units; and executing the selected process segment on the allocated processing units, where i is a positive integer, and p is a positive integer.

15. A computer program product for image processing comprising:

a computer readable medium; and a computer program stored on the computer readable medium, the computer program comprising:

a first portion for executing first-type processing on a first partial image data representing a partial image to generate a second partial image data;

a second portion for executing second-type processing on the second partial image data; and a third portion for repeating the execution of the first and second-type processing on a plurality of partial images aligned to be adjacent to each other using a plurality of processing units, wherein a first-type process segment and a second-type process segment are executed parallel using the plurality of processing units, the first-type process segment relating to i-th partial image, and the second-type process segment relating to a partial image that is selected based on an estimated load from among the (i+1)-th to (i+p)-th partial images, where i is a positive integer, and p is a positive integer.

16. The computer program product recited in claim 15, wherein the third portion executes the first and second-type process segments by hyper threading, wherein each of the processing units is a thread.

17. The computer program product recited in claim 15, wherein in the first-type process segment, the first portion converts the first partial image data represented by a first color system into image data represented by a second color system having M color components to generate M types of the second partial image data corresponding to the color components, and the second-type process segment is halftone processing, where M is an integer of 2 or greater.

18. The computer program product recited in claim 15, wherein the third portion includes:

a fourth portion for allocating process segments of a subject process segment set to the plurality of processing units in sequence, the subject process segment set including:

at least one second-type process segment which relates to i-th partial image but has not yet been allocated to one of the processing units; and a plurality of first-type process segments which relate to (i+1)-th to (i+p)-th partial images but have not yet been allocated to the processing units; and a fifth portion for executing the first and second-type process segments in the allocated sequence on allocated processing units respectively, where i is a positive integer, and p is a positive integer.

19. The computer program product recited in claim 15, wherein the third portion includes:

a fourth portion for selecting one process segment from among a subject process segment set including:

at least one second-type process segment which relates to i-th partial image but has not yet been allocated to one of the processing units; and a plurality of first-type process segments which relate to (i+1)-th to (i+p)-th partial images but have not yet been allocated to the processing units;

allocating the selected process segment to one of the plurality of processing units; and executing the selected process segment on the allocated processing units; and a fifth portion for having the fourth portion execute repeatedly, where i is a positive integer, and p is a positive integer.

* * * * *